United States Patent [19]
>
> Taig

[11] Patent Number: 4,715,462

[45] Date of Patent: Dec. 29, 1987

[54] ELECTRIC POWER ASSISTANCE STEERING SYSTEM

[75] Inventor: Alistair G. Taig, South Bend, Ind.

[73] Assignee: Allied Corporation, Morristown, N.J.

[21] Appl. No.: 868,901

[22] Filed: May 29, 1986

[51] Int. Cl.$^4$ .................. B62D 5/04; G05D 17/00
[52] U.S. Cl. ...................... 180/79.1; 74/388 PS; 180/142; 318/2
[58] Field of Search ............ 180/79.1, 79.3, 142; 74/388 PS, 675, 785, 626; 318/2

[56] References Cited

U.S. PATENT DOCUMENTS

| 2,534,536 | 12/1950 | Staude | 74/388 PS |
|---|---|---|---|
| 4,241,643 | 12/1980 | Taig | 91/446 |
| 4,503,753 | 3/1985 | Bacardit | 91/375 R |

FOREIGN PATENT DOCUMENTS

| 35035 | 3/1977 | Japan | 180/79.1 |
|---|---|---|---|
| 141963 | 8/1983 | Japan | 180/79.1 |
| 154956 | 8/1985 | Japan | 180/79.1 |

Primary Examiner—John J. Love
Assistant Examiner—Mitchell J. Hill
Attorney, Agent, or Firm—Larry J. Palguta; Ken C. Decker

[57] ABSTRACT

The electric power assistance actuating mechanism comprises an input member (12) connected to a sun gear (14) of a planetary gear mechanism (20), with a sleeve member (55) slidably disposed about the input member (12) and keyed for rotation therewith. A carrier member (25) of the planetary gear mechanism (20) includes a flexible plunger (70) which extends radially inwardly to engage a helical slot (61) of predetermined length in the sleeve member (55), the sleeve member (55) disposed between two springs (57) which effect a central or neutral position of the sleeve member (55) on the input member (12) when the flexible plunger (70) is not disposed in the helical slot (61). The sleeve member (55) has a connecting link (59) with a position sensor (60) which operates responsively to axial displacement of the sleeve member (55). An electric motor (40) has a worm gear (33) connected to the outer periphery of a ring gear (19) of the planetary gear mechanism (20). The carrier member (25) is connected to a pinion (28). Rotation of the input member (12) relative to the pinion (28) causes displacement of the sleeve member (25) by the flexible plunger (70), the axial displacement operating the sensor (60) which operates responsively the electric motor (40), causing the worm gear (33) to rotate the ring gear (19) of the planetary gear system (20) so that the rotation of the ring gear (19) follows the rotation of the input member (12).

32 Claims, 6 Drawing Figures

ELECTRIC POWER ASSISTANCE STEERING SYSTEM

The electric power assistance steering system of the present invention relates to electric power steering devices for automotive vehicles.

Power assistance steering systems utilize a force or torque assistance step-up mechanism in order to reduce the amount of steering effort that must be provided by the vehicle driver. The present invention is fundamentally different in that a high reduction ratio is utilized in order to reduce driver effort, and electric power assistance is used to increase the output speed in order to bring the overall apparent ratio of input to output speed to an acceptable level. The changes in output speed occur without causing any changes in torque transmitted to the vehicle driver. Also, when a desired increased output torque is required for maneuvering operations such as parking, an additional feature provides for an increase in the output torque without increasing driver effort.

The present invention comprises a housing having a force step-up transmission for a rotary output member intended to be connected to a driven system to be actuated and a rotary input member intended to be connected to a drive system, the rotary input member providing input rotation to a planetary gear mechanism connected with said rotary output member, an electric motor connected with said planetary gear mechanism to effect rotation of an outer ring gear thereof, means for sensing rotation of said input member relative to said output member, and the rotation sensing means connected with means for operating said electric motor, wherein rotation of said input member relative to said output member is sensed by said rotation sensing means which actuates said operating means that effects operation of said electric motor to rotate said ring gear in accordance with the rotation of said input member.

As will become apparent from the detailed description of the present invention, the present invention provides a very low cost package due to the simplified electrical sensing mechanisms. Additionally, there is provided a direct road feel for the driver and increased safety inherent within the operation of the mechanism. The system has a very low weight, has a quite small overall size, and provides a silent drive. Manual operation of the steering system requires a very low level of effort by a vehicle operator, whether the system has failed or the vehicle operator is rotating the steering wheel while the vehicle's ignition is switched off. Finally, the arrangement of the electric power assistance steering system provides advantageous packaging and installation advantages for most motor vehicles.

One way of carrying out the invention is described in detail with reference to the drawings which illustrate an embodiment in which.

Figure 1:
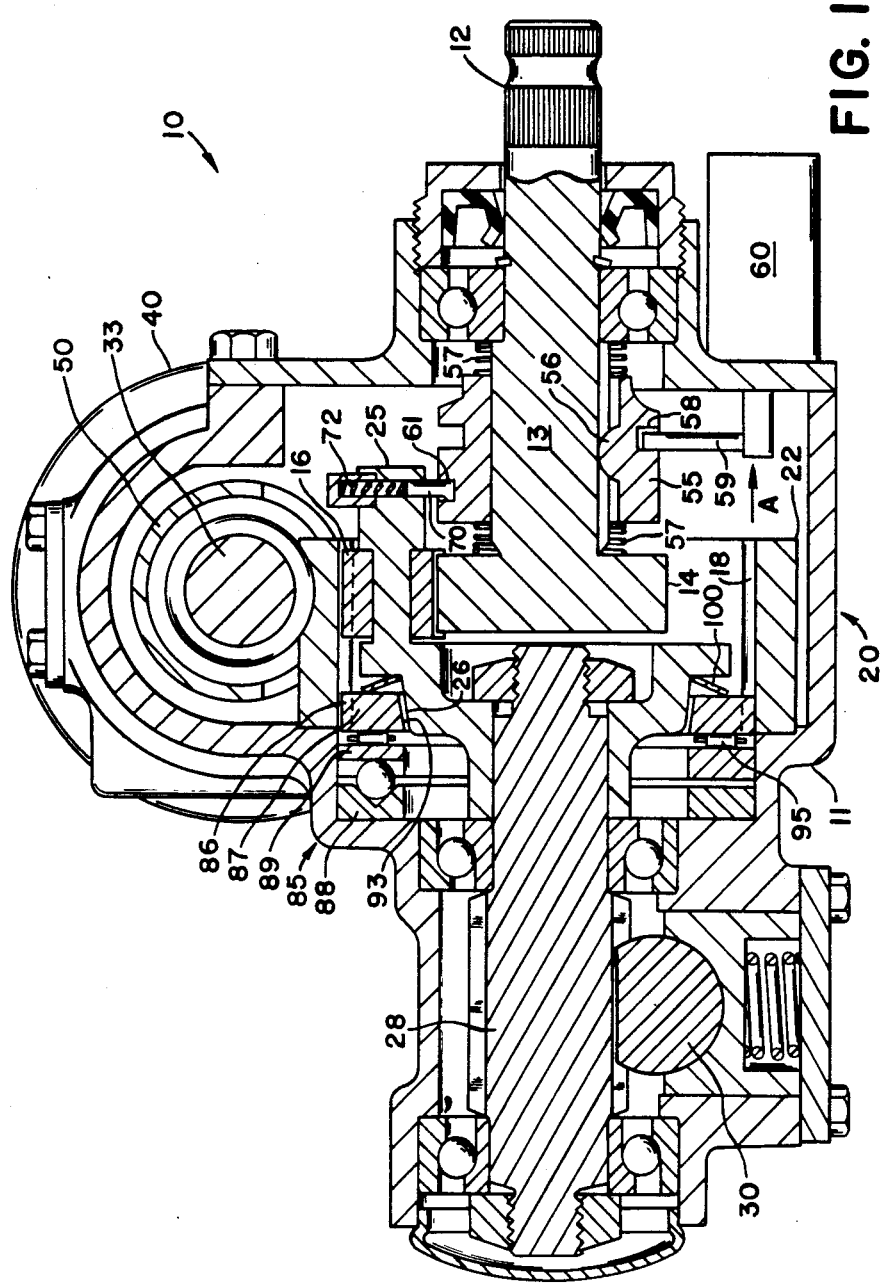
FIG. 1 is a sectional view taken along view line 1—1 of FIG. 2.
Figure 2:
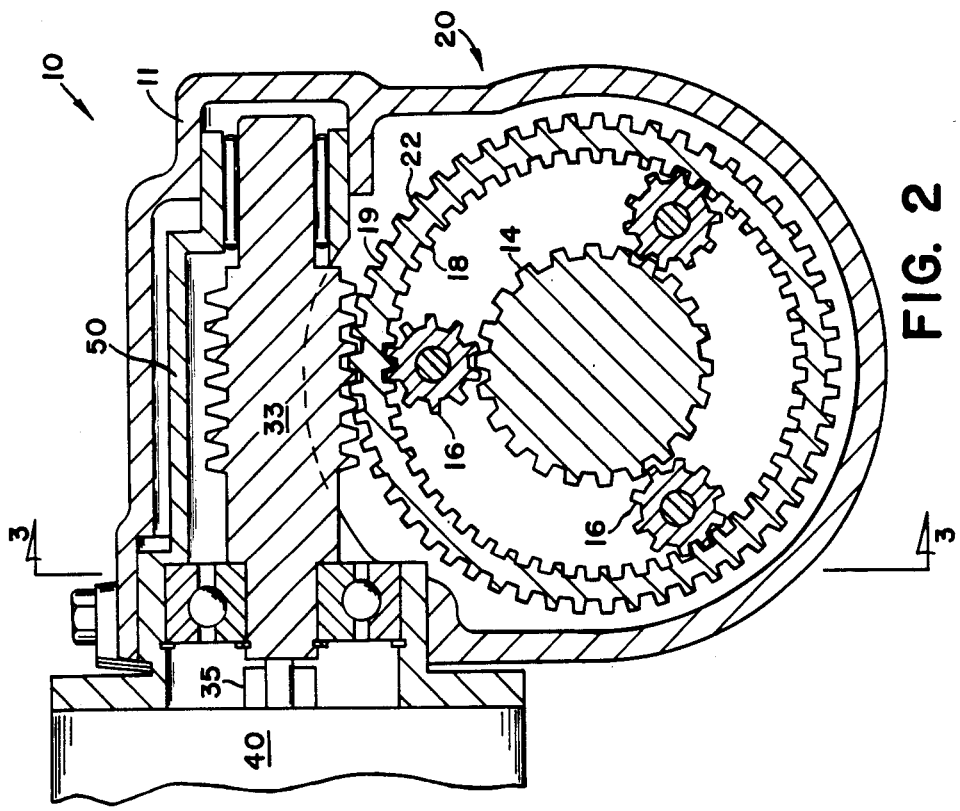
FIG. 2 is a sectional view taken along view line 2—2 of FIG. 1.

FIGS. 1 and 2 illustrate the basic structure of the electric power assistance steering system designated generally by reference numeral 10. The input shaft 12 is connected to the steering column and includes a sun gear 14 of a planetary gear mechanism 20. The planetary gear mechanism comprises three planetary gears 16 disposed about sun gear 14, each of the planetary gears engaging internal teeth 18 disposed along the inner periphery of ring gear 19. Ring gear 19 also includes teeth 22 disposed along the outer periphery thereof. Planetary gears 16 are rotably mounted on a carrier member 25 which is non-rotatably fixed to the pinion 28 which engages a rack 30. The input shaft 12 is mounted coaxially with the pinion 28 in the casing or housing 11. The teeth 22 of the ring gear 19 comprise worm wheel teeth which are coupled with a worm gear 33 mounted on shaft 35 of electric motor 40. Electric motor 40 is mounted on cartridge 50 rotatably mounted within housing 11. (See FIG. 2.)

Figure 3:
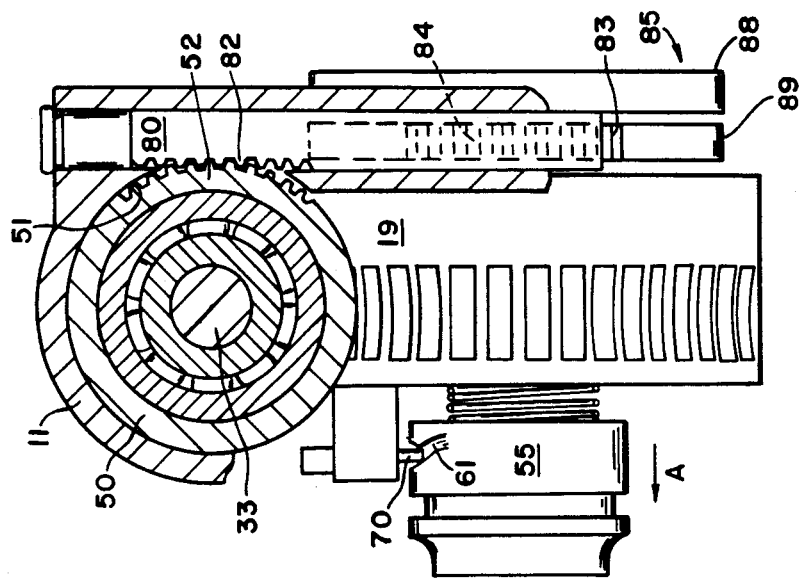
FIG. 3 is a partial sectional view along view line 3—3 of FIG. 2.

A sleeve member 55 is connected by key 56 for rotation with input shaft 12, and is slidably disposed about shaft 12 and between springs 57. The sleeve member 55 includes a radial opening 58 which receives a connecting link 59 of position sensor 60. Sensor 60 operates the electric motor 40 responsively to axial displacement of the connecting link 59 by sleeve member 55. Sleeve member 55 includes a helical slot 61 receiving therein a flexible plunger 70 mounted on carrier member 25. A spring 72 biases flexible plunger 70 radially inwardly into engagement with helical slot 61. As illustrated in FIG. 3, the helical slot 61 has a predetermined length so that sufficient rotation of the input member 12 without energization of the electric motor 40 will cause flexible plunger 70 to exit slot 61 and permit springs 57 to axially center sleeve member 55 to a neutral or centered position along midportion 13 of input member 12.

Figure 4:
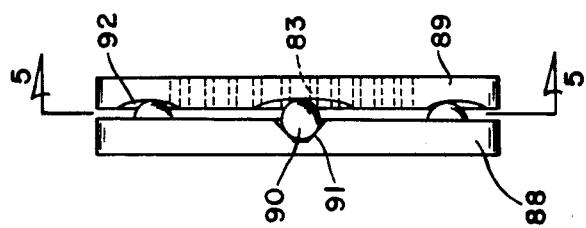
FIG. 4 illustrates a portion of the clutch mechanism of the present invention.

The cartridge 50 includes teeth 51 disposed along outer peripheral portion 52, teeth 51 engaging teeth 82 of slidably movable connecting linkage 80. Connecting linkage 80 is slidably mounted within the housing 11 so that rotation of cartridge 50 by electric motor 40 will cause axial displacement of connecting linkage 80. Connecting linkage 80 also includes teeth 84 which engage teeth 83 of a ring member 89 of a clutch mechanism 85. Clutch mechanism 85 comprises first ring member 87, stationary or second ring member 88, and third ring member 89. Ring members 87-89 are disposed about carrier 25 and pinion 28, with ring members 88 and 89 being mounted upon housing 11. FIG. 4 illustrates in detail the balls 90 which are received within conical pockets 91 of second ring member 88 and positioned for engagement with ramps 92 of third ring member 89.

Figure 5:
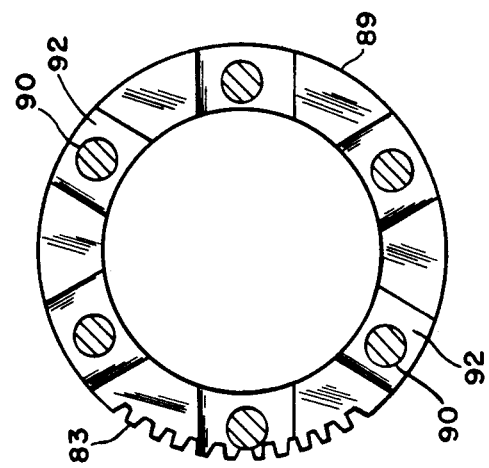
FIG. 5 is a section view taken along view line 5—5 of FIG. 4.

FIG. 5 illustrates the ramps 92 disposed within third ring member 89, wherein rotation of third ring member 89 causes ring member 89 to be displaced axially away from stationary or second ring member 88 illustrated in FIGS. 1 and 4. Located between third ring member 89 and first ring member 87 are thrust bearings 95. First ring member 87 has outer teeth 86 and an inner sloped surface 93. Inner sloped surface 93 is shaped complementary to outer conical surface 26 of carrier 25. When the rotation of third ring member 89 effects axial displacement thereof against thrust members 95, the first ring member 87 (geared for rotation with ring gear 19) is displaced axially along carrier 25 so that there is a frictional engagement and coupling of first ring member 87 with carrier 25 by means of sloped surface 93 and conical surface 26.

The electric power assistance steeering system of the present invention operates as follows: When the vehicle motor is deactivated and the vehicle ignition system is "off", rotation of input shaft 12 causes the planetary gears to rotate, which drives carrier 25 and rotatably attached pinion 28. The pinion 28 is driven at a lower rate and in the same direction as the input shaft 12. When the vehicle ignition is switched "on", rotation of input shaft 12 relative to the output member or pinion 28 causes initially plunger member 70 to follow along the helical slot 61. The movement of flexible plunger 70 within the slot 61 causes axial displacement of sleeve member 55 in the direction of arrow A (FIGS. 1 and 3), which causes axial displacement of the attached connecting link 59 and responsive operation of position sensor 60. The sensor 60 is a two-way device which signals the direction of rotation to the motor control components, and is preferably a graduated device such as a rheostat, which allows the motor to speed up as displacement of the connecting link increases. Sensor 60 operates the electric motor 40 which rotates worm gear 33. Worm gear 33 rotates ring gear 19 so that ring gear 19 follows the motion of the input shaft 12. The result is that the planetary gear mechanism 20 rotates as a locked-up unit in which the input shaft 12, ring gear 19, carrier member 25, and pinion 28 rotate together. Thus, the system provides a direct drive which has a unit ratio. However, the forces on each of the gear teeth within the planetary gear mechanism are unaffected by the motion of ring gear 19, because the planets are free to rotate. Therefore, the torque felt by the vehicle operator through the input shaft is always a fraction of that experienced at the rack and pinion interface. For example, if the planetary gear ratio is 3 to 1 between the input and output members, the torque experienced by the driver will always be one-third of the torque provided at the output member or pinion.

In many vehicles, particularly, those with high front end weights and heavy steering efforts, it is desirable to limit the maximum driver effort required during low speed maneuvers such as parking. Thus, an additional feature is incorporated in the system in order to provide the extra output which does not provide a proportional reaction on the input shaft 12. To achieve this, the clutch mechanism 85 includes the first ring member 87 whose teeth 86 engage the internal teeth 18 of ring gear 19 and has sloped surface 93 which can frictionally engage conical surface 26 in order to couple together ring member 87 and carrier member 25. The axial force to engage ring member 87 with the carrier member 25 is derived from the electric motor torque, a second ring member 88, third ring member 89, and connecting linkage 80. Electric motor 40 is mounted on cartridge 50 which is rotatably mounted within the housing or casing 11. Thus, the cartridge and electric motor are free to rotate within housing 11. Rotation of the cartridge 50 due to electric motor torque is restrained by connecting linkage 80 (FIG. 3), connecting linkage 80 engaging third ring member 89 at teeth intermesh 84, 83. When the electric motor 40 rotates cartridge 50, the connecting linkage 80 is axially displaced within housing 11 so that its teeth 84 effect rotation of third ring member 89 which is axially displaced as balls 90 advance along ramps 92. Axial displacement of ring member 89 against thrust bearings 95 cause axial displacement of first ring member 87 so that surface 93 rotatably engages conical surface 26 and effects a frictional coupling therebetween. The torque at which the first ring member is displaced is determined by a conical spring 100. Thus, when the vehicle operator is turning the wheels during a parking maneuver, greater reaction torque is experienced by the steering system and the resulting rotation of electric motor 40 causes displacement of the connecting linkage 80, rotation of ring member 89, and axial displacement of ring 89 against thrust members 95 and first ring member 87 sufficient to overcome conical spring member 100 so that ring member 87 and carrier member 25 are coupled together for rotation. This effects a bypass connection wherein ring gear 19 and carrier member 25 are coupled directly together so that higher output torque is effected without proportional reaction through the input shaft to the vehicle driver or operator.

It is apparent that other mechanisms, for example screw thread mechanisms, may be utilized to provide the thrust to engage the ring 87 with carrier member 25. The essential feature is that an alternative drive be provided between the motor 40 and carrier member 25 without providing reaction forces through the planetary gear mechanism. Thus, the steering system 10 utilizes motor torque to actuate the bypass clutch 85, thereby insuring that this system cannot be activated in the event of a motor failure. For this reason, it is necessary to use between the motor and ring gear 19 and irreversible drive mechanism such as the worm gear 33 illustrated herein. The irreversible feature of the system also permits manual operation in the event of motor failure.

Figure 6:
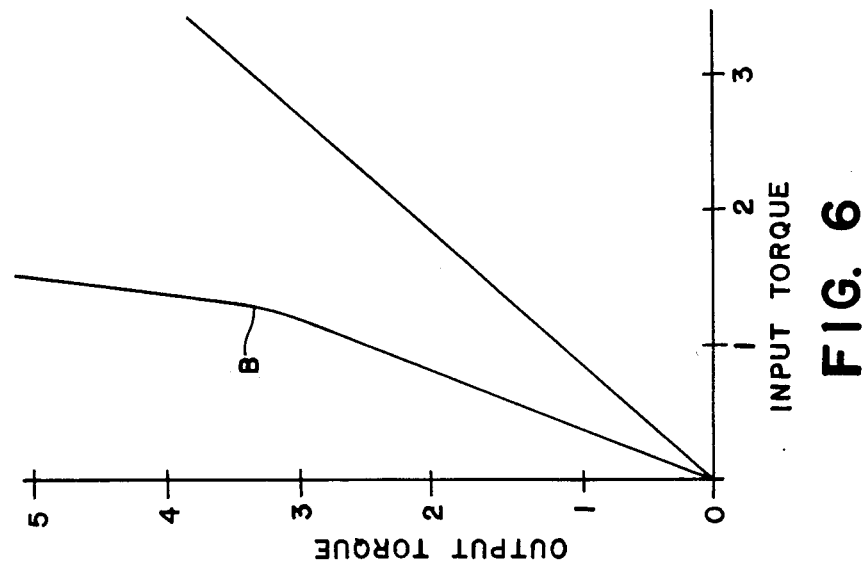
FIG. 6 is a graph of Output Torque vs. Input Torque.

The conical spring 100 provides the threshold level of output torque required for operation of bypass clutch 85. As illustrated in FIG. 6, the required input torque is approximately one-third of the output torque provided, until the threshold B is achieved wherein the ratio of output torque to input torque is much higher for a typical parking maneuver.

An additional feature of the power assistance steering system is that the input shaft 12 (connected to the steering column) will remain in its proper rotational relationship with the pinion 28. After manual operation of input shaft 12 while motor 40 is deenergized, the gear reduction provided by the planetary gear mechanism allows the input member 12 to become displaced relative to pinion 28. For this reason, the sleeve member 55 which detects relative rotation between the input and output members will deactivate the electrical assistance system until the proper alignment is obtained. This is achieved by limiting the circumferential length of the helical groove 61 to a predetermined length in sleeve 55 and thus cause flexible plunger 70 to ride out of the slot 61 against the spring 72, in the event of excessive rotational movement. The two centering springs 57 then return sleeve 55 to a central or neutral position where the position sensor 60 is deenergized. When correct alignment is obtained between the input shaft 12 and output member or pinion 28, the flexible member 70 reenters helical slot 61 and power-assistance can be resumed.

The electric power assistance steering system of the present invention provides considerable advantages over other electric steering systems. The system has a very low cost because a small high speed motor with a high reduction worm drive can be employed. Motor control can be relatively straightforward because torque output is not directly matched to a torque input sensor. The gear ratio provides the basic torque reduction. This system provides direct road feel because there is essentially no lost motion or spring in the mechanism.

Any movement of the input shaft will move the steering mechanism and input torque is proportional to output torque. Typical prior systems employ a torsion bar in the torque sensing system. There is additional safety provided because a locked-up motor cannot prevent the steering gear from turning. In the event of a sudden power failure during driving conditions, the driving effort experienced by the driver does not change and the steering wheel requires only additional rotation. The system provides a very low overall weight because of the small motors, and small package size results in a minimal control device in a lightweight system. The requirement for an irreversible drive allows a worm drive to be employed. A worm drive is an inherently quiet system, whereas other systems must be reversible and employ spur and bevel gears which may not be silent. There is required a very low manual effort by the driver. The gear ratio is different under manual and power operation, and results in low steering effort by the driver. Finally, the worm drive for the motor permits the motor to lie conveniently alongside the rack bar which favors most insulations. Thus, this favorable packaging enables installation in most vehicles.

Although the present invention has been illustrated and described in connection with example embodiment, it will be understood that this is illustrative of the invention, and is by no means restrictive thereof. It is reasonably to be expected that those skilled in the art can make numerous revisions and additions to the invention and it is intended that such revisions and additions will be included in the scope of the following claims as equivalents of the invention.

I claim:

1. An electric power assistance actuating system, comprising a casing housing a force step-up transmission having a rotary output member intended to be connected to a driven system to be actuated and a rotary input member intended to be connected to a drive system, and an electric motor providing power assistance for said rotary output member, characterized in that said input and output members are connected via a planetary gear mechanism wherein the input member actuates a sun gear engaging planetary gears supported by a carrier connected with said output member, the planetary gears disposed between said sun gear and a ring gear of said planetary gear mechanism, means responsive to rotation of said input member relative to said output member providing actuation of means for controlling operation of said electric motor, the electric motor driving a motor gear, said motor gear engaging teeth disposed on the periphery of said ring gear, so that rotation of the input member relative to the output member effects actuation of said electric motor which displaces rotationally said ring gear as said input member is rotated.

2. The electric power assistance actuating mechanism in accordance with claim 1, wherein the means responsive to rotation of the input member relative to the output member comprises a sleeve disposed about said input member, the sleeve displaced by means of a connection with said carrier.

3. The electric power assistance actuating mechanism in accordance with claim 2, wherein said connection comprises a flexible plunger connected with said carrier and the sleeve having a helical slot receiving an end of said flexible plunger.

4. The electric power assistance actuating mechanism in accordance with claim 3, wherein said sleeve is disposed between two resilient members which effect a neutral central position of the sleeve on the input member when said flexible plunger is disengaged from said helical slot.

5. The electric power assistance actuating mechanism in accordance with claim 4, wherein the control means includes a connecting part with said sleeve, the control means effecting an increase in electric motor speed in response to axial displacement of said sleeve along said input member.

6. The electric power assistance actuating mechanism in accordance with claim 5, wherein the motor gear comprises a worm gear which engages the teeth on the periphery of said ring gear.

7. The electric power assistance actuating mechanism in accordance with claim 6, wherein the output member comprises a pinion which engages a rack operatively connected with wheels of a vehicle.

8. The electric power assistance actuating mechanism in accordance with claim 1, wherein said electric motor is connected with a cartridge which permits said motor to rotate relative to said casing.

9. The electric power assistance actuating mechanism in accordance with claim 8, wherein an outer peripheral portion of said cartridge includes teeth thereon.

10. The electric power assistance actuating mechanism in accordance with claim 8, further comprising a clutch mechanism for rotatably coupling said ring gear with said carrier.

11. The electric power assistance actuating mechanism in accordance with claim 10, wherein said clutch mechanism comprises a connecting linkage having teeth engaging teeth on the cartridge, the connecting linkage engaging and operating the clutch mechanism which displaces axially a first ring member which is disposed about a cone-shaped portion of said carrier, the first ring member having outer peripheral teeth engaging inner peripheral teeth of said ring gear, so that axial displacement of said first ring member couples together the first ring member and carrier.

12. The electric power assistance actuating mechanism in accordance with claim 11, wherein said clutch mechanism comprises a second ring member providing seats for a plurality of balls which engage ramps on a third ring member disposed between the second ring member and first ring member, the third ring member having teeth engaging teeth on said connecting linkage.

13. The electric power assistance actuating mechanism in accordance with claim 12, further comprising bearing thrust means between said third ring member and first ring member, electric motor torque causing said cartridge to rotate relative to said casing and effecting displacement of the connecting linkage and rotation of the second ring member, the rotation of the second ring member causing the clutch mechanism to operate and displace axially the first ring member into engagement with the carrier so that rotation of the ring gear by the motor gear rotates directly said carrier.

14. An electric power assistance actuating mechanism comprising a housing having a force step-up transmission for a rotary output member connected to a driven system and a rotary input member connected to a drive system, the rotary input member providing input rotation to a planetary gear mechanism connected with said rotary output member, an electric motor connected with said planetary gear system to effect rotation of an outer ring member thereof, means for sensing rotation of said input member relative to said output member, the rotation sensing means connected with means for operating said electric motor, the input member and output member aligned coaxially and the input member connected to a sun gear of the planetary gear mechanism, the output member connected to a carrier member of the planetary gear mechanism, the rotation sensing means disposed coaxially about said input member and axially displaceable therealong, and the rotation sensing means disposed between two springs which bias said rotation sensing means to a neutral axial position along said input member, wherein rotation of said input member relative to said output member is sensed by said rotation sensing means which actuates said operating means that effects operation of said electric motor to rotate said ring member in accordance with rotation of said input member.

15. The electric power assistance actuating mechanism in accordance with claim 14, wherein the rotation sensing means comprises a sleeve member slidably disposed on said input member and a radially movable plunger member mounted on said carrier member and extending into a slot of said sleeve member.

16. The electric power assistance actuating mechanism in accordance with claim 15, wherein the slot comprises a helical slot of predetermined length, movement of said flexible plunger member out of said slot after traversing said predetermined length permitting said sleeve member to be returned to the neutral axial position.

17. The electric power assistance actuating mechanism in accordance with claim 16, wherein the sleeve member is rotatably coupled to said input member.

18. An electric power assistance actuating mechanism comprising a housing having a force step-up transmission for a rotary output member connected to a riven system and a rotary input member connected to a drive system, the rotary input member providing input rotation to a planetary gear mechanism connected with said rotary output member, an electric motor connected with said planetary gear system to effect rotation of an outer ring member thereof, means for sensing rotation of said input member relative to said output member, the rotation sensing means connected with means for operating said electric motor, wherein rotation of said input member relative to said output member is sensed by said rotation sensing means which actuates said operating means that effects operation of said electric motor to rotate said ring member in accordance with rotation of said input member, the electric motor mounted within a cartridge which is rotatably connected with said housing, the outer ring member comprising a ring gear with radially outer teeth and the electric motor including a gear engaging the teeth of the ring gear, the cartridge having teeth along an outer peripheral portion thereof, a connecting link slidably mounted within said housing and having teeth engaging the teeth of the cartridge, and a clutch mechanism operatively connected to said connecting link and actuated thereby in order to displace axially a first ring member into joint engagement with said ring gear and carrier member.

19. The electric power assistance actuating mechanism in accordance with claim 18, wherein the ring gear has teeth along an inner periphery and the first ring member includes teeth along an outer periphery engaging the teeth of the inner periphery of the ring gear, an inner surface of the first ring member being shaped complementary to a cone-shaped portion of said carrier member about which said first ring member is slidably disposed.

20. The electric power assistance actuating mechanism in accordance with claim 19, wherein the clutch mechanism comprises a plurality of balls movable along ramps to effect axial displacement of the first ring member into joint engagement with said ring gear and carrier member.

21. An electric power assistance actuating mechanism comprising a housing having a force step-up transmission for a rotary output member connected to a driven system and a rotary input member connected to a drive system, the rotary input member providing input rotation to a planetary gear mechanism connected with said rotary output member, an electric motor connected with said planetary gear system to effect rotation of an outer ring member thereof, means for sensing rotation of said input member relative to said output member, the rotation sensing means connected with means for operating said electric motor, wherein rotation of said input member relative to said output member is sensed by said rotation sensing means which actuates said operating means that effects operation of said electric motor to rotate said ring member in accordance with rotation of said input member, the electric motor mounted within a cartridge which is rotatably connected to said housing and operatively connected with the outer ring member so as to couple together selectively the outer ring member and rotary output member.

22. The electric power assistance actuating mechanism in accordance with claim 21, wherein the input member and output member are aligned coaxially, the input member connected to a sun gear of the planetary gear mechanism, and the output member connected to a carrier member of the planetary gear mechanism.

23. The electric power assistance actuating mechanism in accordance with claim 22, wherein the rotation sensing means is disposed coaxially about said input member and axially displaceable therealong.

24. The electric power assistance actuating mechanism in accordance with claim 23, wherein the rotation sensing means is disposed between two springs which bias said rotation sensing means to a neutral axial position along said input member.

25. The electric power assistance actuating mechanism in accordance with claim 24, wherein the rotation sensing means comprises a sleeve member slidably disposed on said input member and a radially movable plunger member mounted on said carrier member and extending into a slot of said sleeve member.

26. The electric power assistance actuating mechanism in accordance with claim 25, wherein the slot comprises a helical slot of predetermined length, movement of said flexible plunger member out of said slot after traversing said predetermined length permitting said sleeve member to be returned to the neutral axial position.

27. The electric power assistance actuating mechanism in accordance with claim 26, wherein the sleeve member is rotatably coupled to said input member.

28. The electric power assistance actuating mechanism in accordance with claim 21, wherein the outer ring member comprises a ring gear with radially outer teeth and the electric motor includes a gear engaging the teeth of the ring gear.

29. The electric power assistance actuating mechanism in accordance with claim 28, wherein the cartridge has teeth along an outer peripheral portion thereof, a connecting link slidably mounted within said housing and having teeth engaging the teeth of the cartridge, and a clutch mechanism operatively connected to said connecting link and actuted thereby in order to displace axially a first ring member into joint engagement with said ring gear and carrier member.

30. The electric power assistance actuating mechanism in accordance with claim 29, wherein the ring gear has teeth along an inner periphery and the first ring member includes teeth along an outer periphery engaging the teeth of the inner periphery of the ring gear, an inner surface of the first ring member being shaped complementary to a cone-shaped portion of said carrier member about which said first ring member is slidably disposed.

31. The electric power assistance actuating mechanism in accordance with claim 30, wherein the clutch mechanism comprises a plurality of balls movable along ramps to effect axial displacement of the first ring member into joint engagement with said ring gear and carrier member.

32. The electric power assistance actuating mechanism in accordance with claim 21, wherein said output member includes a pinion connected to a rack member operatively connected with wheels of a vehicle.

* * * * *